(12) United States Patent
Ahn et al.

(10) Patent No.: US 10,741,829 B2
(45) Date of Patent: Aug. 11, 2020

(54) COMPOSITION FOR FORMING POSITIVE ELECTRODE OF SECONDARY BATTERY, POSITIVE ELECTRODE FOR SECONDARY BATTERY AND SECONDARY BATTERY MANUFACTURED USING THE SAME

(71) Applicant: LG Chem, Ltd., Seoul (KR)

(72) Inventors: Byoung Hoon Ahn, Daejeon (KR); Sang Hoon Choy, Daejeon (KR); Houng Sik Yoo, Daejeon (KR); Ki Won Sung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/751,067

(22) PCT Filed: Mar. 24, 2017

(86) PCT No.: PCT/KR2017/003219
§ 371 (c)(1),
(2) Date: Feb. 7, 2018

(87) PCT Pub. No.: WO2017/164701
PCT Pub. Date: Sep. 28, 2017

(65) Prior Publication Data
US 2018/0233734 A1    Aug. 16, 2018

(30) Foreign Application Priority Data

Mar. 24, 2016 (KR) .................. 10-2016-0035562
Mar. 23, 2017 (KR) .................. 10-2017-0036956

(51) Int. Cl.
| | |
|---|---|
| H01M 4/62 | (2006.01) |
| H01M 4/1391 | (2010.01) |
| H01M 4/139 | (2010.01) |
| H01M 4/13 | (2010.01) |
| H01M 10/0525 | (2010.01) |
| H01M 4/36 | (2006.01) |
| H01M 4/505 | (2010.01) |
| H01M 4/525 | (2010.01) |
| H01M 4/131 | (2010.01) |
| H01M 4/02 | (2006.01) |
| H01M 10/052 | (2010.01) |

(52) U.S. Cl.
CPC .......... *H01M 4/1391* (2013.01); *H01M 4/13* (2013.01); *H01M 4/139* (2013.01); *H01M 4/366* (2013.01); *H01M 4/505* (2013.01); *H01M 4/525* (2013.01); *H01M 4/622* (2013.01); *H01M 4/625* (2013.01); *H01M 10/0525* (2013.01); *H01M 4/131* (2013.01); *H01M 10/052* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 9,711,796 B2 | 7/2017 | Yeou et al. |
| 2011/0311869 A1 | 12/2011 | Oh et al. |
| 2012/0037853 A1 | 2/2012 | Unagami et al. |
| 2015/0200399 A1 | 7/2015 | Yeou et al. |
| 2016/0049643 A1 | 2/2016 | Kim et al. |
| 2017/0110734 A1 | 4/2017 | Tanaka |
| 2018/0198126 A1 | 7/2018 | Fukumine et al. |

FOREIGN PATENT DOCUMENTS

| | | |
|---|---|---|
| CN | 102971892 A | 3/2013 |
| CN | 104126242 A | 10/2014 |
| CN | 105375032 A | 3/2016 |
| EP | 2296208 A1 | 3/2011 |
| JP | 2003157846 A | 5/2003 |
| JP | 2005203244 A | 7/2005 |
| JP | 2006253157 A | 9/2006 |
| JP | 2012099251 A | 5/2012 |
| JP | 201389346 A | 5/2013 |
| JP | 201419619 A | 2/2014 |
| JP | 5533057 B2 | 6/2014 |
| JP | 2015115106 A | 6/2015 |
| JP | 2015133302 A | 7/2015 |
| KR | 20120028860 A | 3/2012 |

(Continued)

OTHER PUBLICATIONS

English translation of KR 2015/0067049 (Year: 2015).*

(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

The present invention provides a composition for forming a positive electrode of a secondary battery which includes a positive electrode active material, a conductive material, and a dispersing agent, in which the conductive material includes a carbon-based material having a specific surface area of 130 m²/g or more and an oil absorption number of 220 ml/100 g or more at 0.1 wt % to 2 wt % with respect to the total weight of the composition for forming a positive electrode, and the dispersing agent is introduced into the conductive material to form a conductive material-dispersing agent composite, and the conductive material-dispersing agent composite has a particle size distribution $D_{50}$ of 0.8 µm to 1.2 µm, a positive electrode for a secondary battery and a secondary battery, which are manufactured using the same.

15 Claims, No Drawings

(56) References Cited

FOREIGN PATENT DOCUMENTS

| KR | 2015/0016852 | * | 2/2015 | ............... B82B 1/00 |
| KR | 20150016852 A | | 2/2015 | |
| KR | 2015/0067049 | * | 6/2015 | .......... H01M 10/052 |
| KR | 20150067049 A | | 6/2015 | |
| KR | 20160029714 A | | 3/2016 | |
| WO | 2015151529 A1 | | 10/2015 | |
| WO | 2017010093 A1 | | 1/2017 | |

OTHER PUBLICATIONS

English translation of KR 2015/0016852 (Year: 2015).*
Extended European Search Report inlcuding Written Opinion for Application No. EP17770671.0 dated Apr. 5, 2018.
Kuroda S et al., "Charge-discharge properties of a cathode prepared with ketjen black as the electro-conductive additive in lithium ion batteries", Journal of Power Sources, Elsevier, Mar. 11, 2003, vol. 119-121, pp. 924-928, XP004430300.
Search report from International Application No. PCT/KR2017/003219, dated Jul. 3, 2017.
Hisashi, Hideyuki "Current State of Electroconductive Carbonblack", Journal of Printing Science and Technology, vol. 44, Issue 3, 2007, pp. 133-143 (Abstract only included for English translation).
Ishii, Toshihiro "Nanoparticle Dispersion Technique by Bead Mill", Convertech (Converting Technologies Magazine), Dec. 2014, pp. 74-77.
Mutsuo, Kuramoto "Dispersion in Coating Material", Journal Jpn. Soc. Colour Mater., vol. 78, No. 4, 2005, pp. 191-196.
Chinese Search Report for Application No. 201780002924.7, dated Jun. 11, 2020, pp. 1-2.

* cited by examiner

COMPOSITION FOR FORMING POSITIVE ELECTRODE OF SECONDARY BATTERY, POSITIVE ELECTRODE FOR SECONDARY BATTERY AND SECONDARY BATTERY MANUFACTURED USING THE SAME

CROSS-REFERENCE TO RELATED APPLICATIONS

This application is a national phase entry under 35 U.S.C. § 371 of International Application No. PCT/KR2017/003219, filed Mar. 24, 2017 which claims priority to and the benefit of Korean Patent Application No. 10-2016-0035562, filed on Mar. 24, 2016 and Korean Patent Application No. 10-2017-0036956, filed on Mar. 23, 2017, the disclosures of which are incorporated herein by reference in their entirety.

TECHNICAL FIELD

The present invention relates to a composition for forming a positive electrode of a secondary battery which can increase dispersibility of a conductive material, thereby improving battery performance, a positive electrode for a secondary battery and a secondary battery manufactured using the same.

BACKGROUND ART

A micro carbon material such as carbon black, Ketjen black, fullerene, graphene or carbon nanotubes has been widely used in energy, aerospace fields, etc. because of excellent electrical characteristic and thermal conductivity. However, while to apply these micro carbon materials, uniform dispersion should be preceded, it is difficult to prepare a high concentration dispersed liquid of such a micro carbon material by a conventional method such as mechanical dispersion, dispersion using a dispersing agent, or dispersion through surface functionalization.

Recently, according to the technical development and increased demand for mobile devices, the demand for secondary batteries as an energy source is dramatically increasing. Among these secondary batteries, a lithium secondary battery which has higher energy density and voltage, a longer cycle lifespan and a lower self-discharge rate has been commercialized and widely used.

In a lithium secondary battery, electrodes including a positive electrode and a negative electrode are manufactured by mixing an electrode active material and a binder with a solvent in a batch to prepare a composition for forming an electrode, and applying the prepared composition for forming an electrode to a collector, followed by drying the composition. Here, to ensure conductivity between the active material and the collector, the composition for forming an electrode may include a fine carbon-based conductive material, and among these materials, carbon black has been widely used in that an active material charging rate can be increased, and the increase in internal resistance of the battery can be suppressed even in a small amount thereof.

However, since a conductive material is used in the form of several tens of nanometer-scale fine particles, they have a high cohesive strength, and therefore when dispersed in a solvent, aggregation between conductive material fine particles easily occurs. Such non-uniform dispersion of the conductive material in an electrode active material layer results in the decrease in conductivity and output characteristic of the battery, and an aggregate prepared by simply aggregating the conductive material has low structure maintenance, conductivity between active materials may be degraded. In addition, the conductive material may cause the non-uniform distribution of the binder in the active material layer and a decrease in the adhesive strength by adsorbing the binder due to a large specific surface area.

Therefore, by a method of preparing a paste by previously dispersing a conductive material in a solvent together with binder, and then adding an electrode active material to the paste, followed by stirring and mixing the resulting mixture, it was intended to solve problems associated with the dispersion of the conductive material. However, a dispersed liquid including a resin-based binder such as a fluorine resin, a cellulose resin, etc. may not have sufficient effects because of poor dispersion stability of conductive material particles and reaggregation of the conductive material particles.

In addition, there was an attempt to increase dispersibility of a conductive material by adding a vinyl pyrrolidone-based polymer as a dispersing agent to a conductive material and a solvent, and thereby, to favorably maintain a load characteristic or cycle characteristic of a battery. However, in this case, an electrode active material was insulated with the added vinyl pyrrolidone-based polymer by coating, or the added vinyl pyrrolidone-based polymer was modified to degrade a discharge characteristic when the battery is stored for a long time while charged, resulting in degradation in battery characteristics.

For the expansion of use of micro carbon particles in various fields as well as the lithium secondary battery, it is necessary to develop a method of uniformly dispersing micro carbon particles.

DISCLOSURE

Technical Problem

The present invention is directed to providing a composition for forming a positive electrode of a secondary battery which may increase conductive material dispersibility to improve battery performance, and a method of preparing the same.

Also, the present invention is directed to providing a positive electrode of a secondary battery and a secondary battery which are manufactured using the composition for forming a positive electrode so that the conductive material is uniformly dispersed.

Technical Solution

To achieve the above-described objects, according to an exemplary embodiment of the present invention, the present invention provides a composition for forming a positive electrode of a secondary battery, which includes a positive electrode active material, a conductive material and a dispersing agent, in which the conductive material includes a carbon-based material having a specific surface area of 130 $m^2/g$ or more and an oil absorption number of 220 ml/100 g or more at 0.1 wt % to 2 wt % with respect to the total weight of a composition for forming a positive electrode, and the dispersing agent is introduced into the conductive material so as to form a conductive material-dispersing agent composite, which has a particle size distribution $D_{50}$ of 0.8 μm to 1.2 μm.

In addition, according to another exemplary embodiment of the present invention, the present invention provides a method of preparing a composition for forming a positive electrode of a secondary battery, which includes preparing a conductive material dispersed liquid by milling a mixture of a conductive material and a dispersing agent in a solvent; and adding a positive electrode active material to the conductive material dispersed liquid and mixing them together, in which the conductive material includes a carbon-based material having a specific surface area of 130 m$^2$/g or more and an oil absorption number of 220 ml/100 g or more at 0.1 wt % to 2 wt % with respect to the total weight of the composition for forming a positive electrode, and the conductive material dispersed liquid includes a conductive material-dispersing agent composite in which the dispersing agent is introduced into the conductive material, and the conductive material-dispersing agent composite has a particle size distribution $D_{50}$ of 0.8 μm to 1.2 μm.

According to still another exemplary embodiment of the present invention, the present invention provides a positive electrode of a secondary battery manufactured using the composition for forming a positive electrode of a secondary battery and a lithium secondary battery including the same.

Other details of other exemplary embodiments of the present invention are included in the detailed description below.

Advantageous Effects

A composition for forming a positive electrode of a secondary battery according to the present invention can considerably improve performance of a battery including a resistance characteristic, a lifespan characteristic, a capacity characteristic and rate capability by uniformly dispersing a conductive material with non-dispersibility in the composition.

MODES OF THE INVENTION

Hereinafter, the present invention will be described in further detail to help in understanding the present invention.

The terms and words used herein and in the claims should not be interpreted as being limited to conventional or literal meanings, but should be interpreted with meanings and concepts which are consistent with the technological scope of the invention based on the principle that the inventors have appropriately defined concepts of terms to describe the invention in the best way.

According to the demand for high capacity and high output characteristics in a secondary battery, the application of a high-conductivity conductive material which has a large specific surface area and a developed secondary particle structure is needed. Compared to a conventional commercialized conductive material, due to high cohesive strength between particles, a high-conductivity conductive material has non-dispersibility, therefore is difficult to be uniformly dispersed by a mixing method used in a conventional slurry mixing process. As an example, carbon black formed by aggregating primary particles as a unit particle is improved in conductivity by developing a bonding structure of primary particles. However, such conductivity-improved carbon black easily makes an aggregate since primary particles have a small size and a large surface area, and is difficult to be dispersed due to a high oil absorption number. When the dispersion of a conductive material in an electrode is insufficient, the conductive material is not suitably distributed on the surface of an active material, thereby the performance of a battery cell is degraded, and performance deviation between cells is increased. In addition, when the dispersion of a conductive material is excessively performed, the distributed conductive material may be advantageously distributed on the surface of an active material, but an intracellular resistance is increased since it is difficult to form a network between the conductive materials.

In addition, when mixed with a dispersing agent, the conductive material is dispersed and included in the form of a conductive material-dispersing agent composite in which the dispersing agent is introduced to a conductive material surface by physical or chemical bonding. Here, particle size distribution of the conductive material-dispersing agent composite thus formed represents dispersibility of a conductive material in a composition.

Accordingly, in the present invention, to have optimum dispersion in an electrode, physical properties of a conductive material and a dispersing agent were controlled in combination, and the particle size distribution of the conductive material-dispersing agent composite produced in the composition may be controlled by optimizing milling conditions when the conductive material and a dispersing agent are dispersed so that a conductive material with non-dispersibility is uniformly dispersed in the composition, resulting in drastically improvement in performance of a battery including a resistance characteristic, a lifespan characteristic, a capacity characteristic and rate capability.

Specifically, the composition for forming a positive electrode of a secondary battery according to an exemplary embodiment of the present invention includes a positive electrode active material, a conductive material and a dispersing agent, in which the conductive material includes a carbon-based material having a specific surface area of 130 m$^2$/g or more and an oil absorption number of 220 ml/100 g or more at 0.1 wt % to 2 wt % with respect to the total weight of the composition for forming a positive electrode, the dispersing agent is introduced into the conductive material to form a conductive material-dispersing agent composite, which has a particle size distribution $D_{50}$ of 0.8 μm to 1.2 μm. In the present invention, unless particularly defined otherwise, a content of the carbon-based material is a value based on the total weight of a solid content in the composition for forming a positive electrode.

As described above, in the composition for forming a positive electrode of a secondary battery according to an exemplary embodiment of the present invention, when the particle size distribution $D_{50}$ of the conductive material-dispersing agent composite satisfies the above range, dispersibility of the conductive material is considerably improved, resulting in improvement in battery performance due to reduction in resistance characteristic in an electrode when the electrode is formed. When the particle size distribution $D_{50}$ of the conductive material-dispersing agent composite is less than 0.8 μm, as the conductive material is over-dispersed, it is difficult to form a conductive material network between active materials in an electrode when a positive electrode is formed, resulting in an increase in cell resistance. In addition, when the particle size distribution $D_{50}$ of the conductive material-dispersing agent composite is more than 1.2 μm, due to insufficient dispersion of the conductive material, the conductive material is not suitably distributed on the surface of the active material, and therefore cell performance is degraded and the performance deviation between cells is increased. In consideration of optimum dispersibility of the conductive material and a noticeable improved effect thereby, the conductive material-dispersing agent composite included in the composition for forming a positive electrode may have a particle size distribution $D_{50}$ of 0.8 μm to 1.2 μm, and $D_{90}$ of 2.0 μm to 5.0 μm or less.

The above-mentioned particle size distribution parameter of the conductive material-dispersing agent composite is influenced by physical properties and contents of the conductive material and the dispersing agent, and, among these, particularly, physical properties and a content of the conductive material. In addition, when a large amount of the conductive material is included in the composition for forming a positive electrode, dispersion is not easily performed, and thus a difference according to particle size distribution may be insignificant, but when a certain amount or less of the conductive material is included, there may be optimum particle size distribution according to the physical properties of the conductive material.

Specifically, in the composition for forming a positive electrode of a secondary battery according to an exemplary embodiment of the present invention, the conductive material includes a carbon-based material having a specific surface area (SSA) of 130 m²/g or more and an oil absorption number (OAN) of 220 ml/100 g or more at 0.1 wt % to 2 wt % with respect to the total weight of the composition for forming a positive electrode.

In the present invention, the "specific surface area (SSA)" of the carbon-based material may be defined as a value measured by a nitrogen adsorption method, and the "oil absorption number (OAN)" is a value measured for a characteristic of absorbing a liquid (oil), in which the specific surface area and the oil absorption number may be used as values indicating a structural characteristic or a degree of structural development of a carbon-based material. In a general carbon-based material having a secondary particle structure formed by the assembly of primary particles, a small size of primary particles and larger specific surface area and oil absorption number of secondary particles mean a developed structure. In this case, the carbon-based material may exhibit excellent conductivity, and however low dispersibility. Therefore, in consideration of the conductivity and dispersibility in an electrode, the developed structure in the carbon-based material should be optimized.

Specifically, in the composition for forming a positive electrode of a secondary battery according to an exemplary embodiment of the present invention, the conductive material includes a secondary particle-shape carbon-based material formed by the assembly of primary particles, and the carbon-based material may have a specific surface area of 130 m²/g or more, and an oil absorption number of 220 ml/100 g or more. Since having the above-described developed structure, the conductive material may exhibit much higher conductivity and dispersibility.

More specifically, since the carbon-based material may have a highly-developed structure in which the average particle size ($D_{50}$) of primary particles is 15 nm to 35 nm, a specific surface area of secondary particles, which are formed by the assembly of the primary particles, is 130 m²/g to 270 m²/g, and an oil absorption number is 220 ml/100 g to 400 ml/100 g, it may exhibit much higher conductivity and dispersibility, and particularly, when applied into a positive electrode, reactivity may be improved by increasing electron donating ability of the triple phase boundary between a positive electrode active material and an electrolyte. If the average particle size of the primary particles of the carbon-based material is less than 15 nm, or the specific surface area of the secondary particles and the oil absorption number are more than 270 m²/g and 400 ml/100 g, respectively, there are concern about aggregation of carbon-based materials, in this case, dispersibility may be degraded. In addition, if the average particle size is more than 35 nm or the specific surface area of the secondary particles and the oil absorption number are less than 130 m²/g and less than 220 ml/100 g, respectively, due to an excessively large size of the primary particles and a less developed structure of the conductive material, dispersion may be easily performed, but due to a small volume of the conductive material per the same weight, an active material surface may not be sufficiently covered, resulting in probability of the decrease in cell performance and the increased performance deviation between cells. More specifically, in consideration of considerable influences of the average particle size of the primary particles and the specific surface area of the secondary particles and the oil absorption number in the carbon-based material on conductivity and dispersibility, in the carbon-based material, the average particle size ($D_{50}$) of the primary particles may be 20 nm to 35 nm, the specific surface area of the secondary particles may be 130 m²/g to 270 m²/g, and the oil absorption number may be 220 ml/100 g to 400 ml/100 g.

Meanwhile, in the present invention, the average particle size ($D_{50}$) of primary particles in the carbon-based material may be defined as a 50% particle size of particle size distribution. In addition, the average particle size ($D_{50}$) of the carbon-based material may be measured by, for example, a laser diffraction method, and more specifically, the carbon-based material may be dispersed in a solvent, then introduced into a commercially available laser diffraction particle size analysis instrument (e.g., Microtrac MT 3000), and sonicated at approximately 28 kHz (power: 60 W), thereby calculating the average particle size ($D_{50}$) based on 50% particle size distribution in the analysis instrument.

The carbon-based material may be, specifically, a graphite such as natural graphite or artificial graphite; a carbon black such as acetylene black, Ketjen black, channel black, furnace black, lamp black or thermal black; or a carbon material such as a carbon fiber. Among these, more specifically, the carbon-based material may be carbon black.

In addition, the carbon black may be classified into various types according to a preparation method and components. The carbon black which can be used in the present invention may be acetylene black, Ketjen black, channel black, furnace black, lamp black, thermal black or Denka black, which may be used alone or in combination with two or more thereof.

More specifically, considering excellent conductivity and dispersibility in the preparation of the composition for forming a positive electrode, the carbon black may be prepared using an acetylene gas, and specifically, by thermal decomposition of an acetylene gas under an anaerobic atmosphere, and may have the average particle size ($D_{50}$) of primary particles of 20 nm to 30 nm.

In addition, the carbon black may be controlled in content of metal impurities therein by impurity control during the preparation or a purification process after the preparation, and thus specifically, have a purity of 99.5% or more.

In one example, in a lithium secondary battery, the lifespan characteristic is degraded due to deterioration of components by various causes, and one of the major causes is influx of metal impurities contained in the conductive material into the battery. Specifically, metal impurities such as iron (Fe) contained in the conductive material is dissolved in an electrolyte solution at an operating voltage of the lithium secondary battery, ranging from approximately 3.0 V to 4.5 V, and the dissolved metal impurities are reprecipitated in the form of a metal from a negative electrode. The precipitated metal penetrates a separator to form a short circuit with a positive electrode, resulting in low-voltage defects, and degradation in capacity and lifespan characteristics of the secondary battery, and therefore the battery may not be properly served as a battery. As a result, it is important to prevent the influx of impurities, particularly, metal impurities when a conductive material is applied to the secondary battery. For this reason, the carbon black used herein may be carbon black having a high purity in the above-mentioned range, from which the maximum content of metal impurities is eliminated.

In the present invention, the content of impurities, particularly, metal impurities, in the carbon black may be analyzed or confirmed using a magnetic property, or by a method including one or more thermal analysis methods such as X-ray diffraction (XRD), differential thermal analysis (DTA), differential scanning calorimetry (DSC), modulated differential scanning calorimetry (MDSC), thermogravimetric analysis (TGA), thermogravimetric-infrared (TG-IR) analysis and measurement of a melting point. Specifically, the content of the metal impurities in the carbon black may be measured from the main peak intensities of the metal impurities obtained by XRD.

In addition, in the conductive material dispersed liquid according to an exemplary embodiment of the present invention, the surface of the carbon black may be treated to increase dispersibility in the dispersed liquid.

Specifically, the carbon black may impart hydrophilicity by introducing an oxygen-containing functional group to the carbon black surface by oxidation; or imparting hydrophobicity by treatment of the carbon black with fluoride or silicon. In addition, the carbon black may be coated with a phenol resin or mechanically and chemically treated. In one example, the carbon black may be oxidized by thermal treatment in an air or oxygen atmosphere at approximately 500° C. to 700° C. for approximately 1 to 2 hours. However, when the surface of the carbon black is excessively treated, electric conductivity and a strength characteristic of the carbon black itself may be highly reduced, and thus is preferable to be suitably controlled.

More specifically, the carbon black may have an iodine number of 200 mg/g to 400 mg/g, measured according to ASTM D-1510. When the iodine number of the carbon black is less than 200 mg/g, it is difficult to sufficiently disperse the carbon black, and when the iodine number of the carbon black is more than 400 mg/g, conductivity may be reduced.

The term "iodine number" used herein is the amount of iodine in grams (g) that is absorbed to 100 g of a sample by converting the amount of halogen absorbed when a halogen is reacted with a fat or fatty acid using a reaction of adding a halogen to a double bond, and is used as the value representing the number of double bonds of unsaturated fatty acids in a sample. As the iodine number is increased, the number of double bonds is increased.

The carbon-based material may be included at 0.1 wt % to 2 wt % with respect to the total weight of a solid content in the composition for forming a positive electrode. When the content of the carbon-based material is less than 0.1 wt %, the improvement in conductivity according to the use of carbon-based material is insignificant, and when the content of the carbon-based material is more than 2 wt %, the dispersibility may be degraded, and the cell capacity may be reduced. In consideration of noticeable improvement according to the use of carbon-based material, the carbon-based material may be included at 0.5 wt % to 1.5 wt % with respect to the total weight of a solid content in the composition for forming a positive electrode.

In addition, in the composition for forming a positive electrode according to an exemplary embodiment of the present invention, the conductive material may further include a conventional conductive material in addition to the carbon-based material to improve conductivity.

Specifically, the conductive material may further include a fibrous conductive material which more easily forms a conductive network when mixed with the carbon-based material, and easily forms a triple phase boundary with an active material when applied to a battery. The fibrous conductive material may be a fibrous conductive material, for example, a carbon nanorod or a carbon nanofiber, which has an aspect ratio (a ratio of the length of the major axis crossing the center of the fibrous conductive material to the diameter perpendicular to the major axis) of more than 1.

In addition, a length of the fibrous conductive material has an influence on electric conductivity of a dispersed liquid, strength and dispersibility. Specifically, as the fibrous conductive material becomes longer, the electric conductivity and the strength characteristic may be increased, however, when the fibrous conductive material is excessively long, the dispersibility may be degraded. Therefore, the aspect ratio of the fibrous conductive material suitable for the present invention may be 5 to 50,000, and more specifically 10 to 15,000.

Such a fibrous conductive material may be used at 0.1 parts by weight to 10 parts by weight with respect to 100 parts by weight of the carbon-based material. When the content of the fibrous conductive material is excessively lower than that of the carbon-based material, conductivity improvement according to the use of the carbon-based material together with the conductive material is less effective, and when the content of the fibrous conductive material is more than 10 parts by weight, there is concern about the decrease in dispersibility of the fibrous conductive material.

In addition, generally, in the preparation of a composition for forming an electrode using a dispersing agent, a conductive material is dispersed in a dispersion medium in the form of a composite physically or chemically bonded with the dispersing agent.

Accordingly, in the present invention, in the preparation of a composition for forming a positive electrode using the above-described conductive material, a partially hydrogenated nitrile rubber which is controlled in a repeat unit region having a structure capable of interacting with the conductive material and a repeat unit region having a structure capable of interacting with a dispersion medium is used as a dispersing agent so that the conductive material is uniformly dispersed in the dispersion medium, and the dispersing agent can have low viscosity even when a high concentration of the conductive material is dispersed.

Specifically, in the composition for forming a positive electrode according to an exemplary embodiment of the present invention, the dispersing agent may include a partially hydrogenated nitrile rubber, which includes a repeat unit having an 4-unsaturated nitrile-derived structure as a repeat unit region (A) having a structure capable of interacting with a carbon-based material; and a repeat unit having a conjugated diene-derived structure and a repeat unit having a hydrogenated conjugated diene-derived structure as repeat unit regions (B) having a structure capable of interacting with a dispersion medium. Here, selectively, the partially hydrogenated nitrile rubber may further include a copolymerizable comonomer on condition that a conductive material-dispersing agent composite has the above-described particle size distribution.

The partially hydrogenated nitrile rubber may be prepared by, specifically, copolymerizing $\alpha$, $\beta$-unsaturated nitrile, a conjugated diene, and selectively another type of copolymerizable comonomer, and then hydrogenating C═C double bonds in the resulting copolymer. Here, the polymerization process and the hydrogenation process may be carried out according to conventional methods, respectively.

The α, β-unsaturated nitrile that can be used in the preparation of the partially hydrogenated nitrile rubber may be specifically acrylonitrile or methacrylonitrile, which may be used alone or in combination with two or more thereof.

In addition, the conjugated diene that can be used in the preparation of the partially hydrogenated nitrile rubber may be specifically a conjugated diene having 4 to 6 carbon atoms such as 1,3-butadiene, isoprene, or 2,3-methylbutadiene, which may be used alone or in combination with two or more thereof.

Moreover, the another type of copolymerizable comonomer selectively used, which can be used in the preparation of the partially hydrogenated nitrile rubber, may include specifically aromatic vinyl monomers (e.g., styrene, α-methylstyrene, vinyl pyridine, fluoroethyl vinyl ether, etc.), α,β-unsaturated carboxylic acid (e.g., acrylic acid, methacrylic acid, maleic acid, fumaric acid, etc.), an ester or amide of α,β-unsaturated carboxylic acid (e.g., methyl (meth)acrylate, ethyl (meth)acrylate, n-dodecyl (meth)acrylate, methoxymethyl (meth)acrylate, hydroxyethyl (meth)acrylate, or polyethylene glycol (meth)acrylate, etc.), and an anhydride of α,β-unsaturated dicarboxylic acid (e.g., maleic acid anhydride, itaconic anhydride, citraconic anhydride, etc.), but the present invention is not limited thereto.

More specifically, the partially hydrogenated nitrile rubber further includes an ester of α, β-unsaturated carboxylic acid, for example, a (meth)acrylate-based monomer as a comonomer. Examples of the (meth)acrylate-based monomer may include methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, 2-hydroxyethylacrylate, methylmethacrylate, ethylmethacrylate, propylmethacrylate, 2-hydroxyethylmethacrylate, and hydroxypropylmethacrylate.

In the partially hydrogenated nitrile butadiene-based rubber prepared by the above-described method, a content ratio of the repeat unit of the α, β-unsaturated nitrile-derived structure, the repeat unit of the conjugated diene-derived structure, the repeat unit of the hydrogenated conjugated diene-derived structure and the repeat unit of the selective-added another type of copolymerizable comonomer-derived structure may vary in a wide range, and the total sum of the contents of the repeat units having the respective structures are 100 wt %.

Specifically, considering improvement in dispersibility of the carbon-based materials and miscibility with the dispersion medium, in the partially hydrogenated nitrile rubber, a content of the repeat unit of the α, β-unsaturated nitrile-derived structure may be 20 wt % to 50 wt %, more specifically, 20 wt % to 30 wt % with respect to the total weight of the partially hydrogenated nitrile rubber. When the repeat unit of the α, β-unsaturated nitrile-derived structure is included in the above-mentioned content range, the dispersibility of the conductive material may be increased, thereby imparting high conductivity even with a small amount of the conductive material.

In the present invention, a content of the repeat unit of the α, β-unsaturated nitrile-derived structure in the partially hydrogenated nitrile rubber is a weight ratio with respect to the entire rubber of the repeat unit of the α, β-unsaturated nitrile-derived structure, and the content is the median value of the value quantified by measuring the level of nitrogen generated and converting the binding level of the nitrogen from the molecular weight of acrylonitrile according to the mill oven method of JIS K 6364.

In addition, the partially hydrogenated nitrile rubber may include the repeat unit of the hydrogenated conjugated diene-derived structure at 20 wt % to 70 wt %, more specifically, 20 wt % to 50 wt %, and further more specifically, 30 wt % to 50 wt % with respect to the total weight of the partially hydrogenated nitrile rubber. As the repeat unit of the hydrogenated conjugated diene-derived structure is included in the above-mentioned content range, the miscibility with the dispersion medium is increased, and thereby the dispersibility of the carbon-based materials may be increased.

In addition, when the partially hydrogenated nitrile rubber further includes additional another type of copolymerizable comonomer, the content ratio may vary according to the type and property of the comonomer, and specifically, the content of the repeat unit of the comonomer-derived structure may be 30 wt % or less, and more specifically 10 wt % to 30 wt % with respect to the total weight of the partially hydrogenated nitrile rubber.

Further more specifically, the partially hydrogenated nitrile rubber may be an acrylonitrile-butadiene rubber (H-NBR) which includes a repeat unit of a structure of Formula 1 below, a repeat unit of a structure of Formula 2 below and a repeat unit of a structure of Formula 3 below, and selectively, further includes a repeat unit of a structure derived from an ester of α, β-unsaturated carboxylic acid. Here, a content of the repeat unit of the acrylonitrile-derived structure of Formula 1 below may be 20 wt % to 50 wt % with respect to the total weight of the rubber. In addition, a content of the repeat unit of the hydrogenated butadiene-derived structure of Formula 3 below may be 20 wt % to 50 wt % with respect to the total weight of the rubber. In addition, when the partially hydrogenated nitrile rubber further includes the repeat unit of the structure derived from the ester of α, β-unsaturated carboxylic acid, a content of the repeat unit of the structure derived from the ester of α, β-unsaturated carboxylic acid may be 30 wt % or less, and more specifically 10 wt % to 30 wt % with respect to the total weight of the rubber.

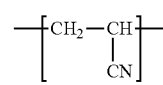
[Formula 1]

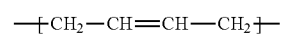
[Formula 2]

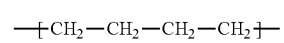
[Formula 3]

In addition, the partially hydrogenated nitrile rubber may have a weight average molecular weight of 10,000 g/mol to 700,000 g/mol, and more specifically 10,000 g/mol to 200,000 g/mol. In addition, the partially hydrogenated nitrile rubber may have a polydispersity index (PDI; Mw/Mn ratio, where Mw is a weight average molecular weight, and Mn is a number average molecular weight) in a range of 2.0 to 6.0, specifically, 2.0 to 4.0. When the partially hydrogenated nitrile rubber has the above-mentioned ranges of the weight average molecular weight and the polydispersity index, the parameter of the average particle size of the conductive material-dispersing agent composite is satisfied, and therefore the conductive material may be uniformly dispersed in the dispersion medium.

In the present invention, the weight average molecular weight and the number average molecular weight are polystyrene-converted molecular weights analyzed by gel permeation chromatography (GPC).

In addition, the partially hydrogenated nitrile rubber may have a Mooney viscosity of 10 to 120, and more specifically 10 to 100 (ML 1+4 at 100° C.). In the present invention, the Moony viscosity of the partially hydrogenated nitrile rubber may be measured according to ASTM standard D 1646.

Meanwhile, in the composition for forming a positive electrode according to an exemplary embodiment of the present invention, the positive electrode active material is a compound enabling reversible intercalation and deintercalation of lithium ions (lithiated intercalation compound), and specifically, a material having a hexagonal close-packed layered rock salt structure (as a specific example, $LiCoO_2$, $LiCo_{1/3}Mn_{1/3}Ni_{1/3}O_2$, or $LiNiO_2$), a material having an olivine structure (as a specific example, $LiFePO_4$), a spinel material having a cubic structure (as a specific example, $LiMn_2O_4$), a vanadium oxide such as $V_2O_5$, or a chalcogen compound such as TiS or MoS.

More specifically, the positive electrode active material may be a lithium composite metal oxide including a metal such as cobalt, manganese, nickel or aluminum, and lithium. Specifically, the lithium composite metal oxide may include lithium-manganese-based oxides (e.g., $LiMnO_2$, $LiMn_2O$, etc.), lithium-cobalt-based oxides (e.g., $LiCoO_2$, etc.), lithium-nickel-based oxides (e.g., $LiNiO_2$, etc.), lithium-nickel-manganese-based oxides (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxides (e.g., $LiNi_{1-Y}Co_YO_2$ (where $0<Y<1$), etc.), lithium-manganese-cobalt-based oxides (e.g., $LiCo_{1-Y}Mn_YO_2$ (where $0<Y<1$), $LiMn_{2-Z}Co_ZO_4$ (where $0<Z<2$), etc.), lithium-nickel-manganese-cobalt-based oxides (e.g., $Li(Ni_PCo_QMn_R)O_2$ (where $0<P<1$, $0<Q<1$, $0<R<1$, $P+Q+R=1$), $Li(Ni_PCo_QMn_R)O_4$ (where $0<P<2$, $0<Q<2$, $0<R<2$, $P+Q+R=2$), etc.), and lithium-nickel-cobalt-manganese-metal (M) oxides (e.g., $Li(Ni_PCo_QMn_RM_S)O_2$ (where M is selected from the group consisting of Al, Cu, Fe, V, Cr, Ti, Zr, Zn, Ta, Nb, Mg, B, W and Mo, and P, Q, R and S are atomic fractions of independent elements, respectively, $0<P<1$, $0<Q<1$, $0<R<1$, $0<S<1$, and $P+Q+R+S=1$), etc.), which may be used alone or in combination with two or more. Among these, considering that a method of evaluating the lifespan of the positive electrode active material according to the present invention is performed under harsh conditions such as a high temperature and a high voltage, to obtain a more precise and highly reliable evaluation result for the lifespan characteristic without deterioration of the positive electrode active material, the positive electrode active material may be a lithium composite metal oxide having a layered structure, and more specifically lithium cobalt oxide having a layered structure.

In addition, in the lithium composite metal oxide, at least one of the metal elements except lithium may be doped with any one or two or more elements selected from the group consisting of Al, Cu, Fe, V, Cr, Ti, Zr, Zn, Ta, Nb, Mg, B, W and Mo. As such, when a lithium-deficient lithium composite metal oxide is further doped with the metal element, structural stability of a positive electrode active material may be improved, resulting in improved output characteristic of a battery. Here, a content of the doped element included in the lithium composite metal oxide may be suitably adjusted within the range that does not degrade the characteristics of the positive electrode active material, and may be specifically 0.02 atom % or less.

More specifically, the lithium composite metal oxide may include a compound of Formula 4 below:

$$Li_{1+a}Ni_xCo_yMn_zM_wO_2 \quad \text{[Formula 4]}$$

In Formula 4, M may include any one or two or more elements selected from the group consisting of Al, Cu, Fe, V, Cr, Ti, Zr, Zn, Ta, Nb, Mg, B, W and Mo, and a, x, y, z and w are each independently the atomic fractions of corresponding elements ($-0.5 \leq a \leq 0.5$, $0 \leq x \leq 1$, $0 \leq y \leq 1$, $0 \leq z \leq 1$, $0 \leq w \leq 1$ and $0 < x+y+z \leq 1$).

In addition, considering a noticeably improved effect according to the use of the combination of the optimized conductive material and the dispersing agent, the positive electrode active material may include a compound of Formula 4 ($0<x<1$, $0<y<1$, $0<z<1$, and $y+z \leq x$), and to increase the capacity characteristic and stability of a battery, the positive electrode active material is, more specifically, $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$ or $LiNi_{0.8}Mn_{0.1}Co_{0.1}O_2$, which may be used alone or in combination with two or more thereof.

In addition, selectively, the composition for forming a positive electrode according to an exemplary embodiment of the present invention may be further include a binder.

The binder serves to improve attachment between positive electrode active material particles and an adhesive strength between the positive electrode active material and a collector. As a specific example, the binder may be polyvinylidenefluoride (PVDF), polyvinylidenefluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated-EPDM, styrene butadiene rubber (SBR), fluororubber, or various copolymers thereof, and may be used alone or in combination two or more thereof. The binder may be included at 1 wt % to 30 wt % with respect to a total weight of a solid content in the composition for forming a positive electrode.

The composition for forming a positive electrode according to an exemplary embodiment of the present invention having the above-mentioned composition may be prepared by adding a positive electrode active material, a conductive material, a dispersing agent and selectively a binder to a solvent, and then mixing them for dissolution and dispersion. For this reason, the composition for forming a positive electrode may further include a solvent.

The solvent may be any one that is conventionally used in the preparation of a composition for forming a positive electrode without particular limitation. Specifically, examples of the solvent may include amide-based polar organic solvents such as dimethylformamide (DMF), diethyl formamide, dimethyl acetamide (DMAc), N-methyl pyrrolidone (NMP), etc.; alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol, etc.; glycols such as ethylene glycol, diethylene glycol, triethylene glycol, propylene glycol, 1,3-propanediol, 1,3-butanediol, 1,5-pentanediol, hexyleneglycol, etc.; polyhydric alcohols such as glycerin, trimethylolpropane, pentaerythritol, sorbitol, etc.; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetra ethylene glycol monoethyl ether, ethylene glycol monobutyl ether, diethylene gylcolmonobutyl ether, triethylene glycol monobutyl ether, tetraethylene glycol monobutyl ether etc.; ketones such as acetone, methyl ethyl ketone, methylpropyl ketone, cyclopentanone, etc.; and esters such as ethyl citrate, γ-butyl lactone, ε-propiolactone, etc., and the like, which may be used alone or in combination with two or more thereof. More specifically, in consideration of improved dispersibility of the carbon black and the dispersing agent, the solvent may be an amide-based polar organic solvent.

In the composition for forming a positive electrode according to an exemplary embodiment of the present invention having the above-described composition, contents of the positive electrode active material, the conductive material, the dispersing agent, the solvent and selectively the binder may be suitably determined by the processability and an improved effect on the characteristics of the positive electrode in the manufacture of a positive electrode.

Specifically, for uniform dispersion of the conductive material in the composition for forming a positive electrode, the conductive material including the carbon-based material may be included at 0.1 wt % to 10 wt % with respect to the total weight of a solid content in the composition for forming a positive electrode. When the conductive material is included in the above-mentioned content range, a good balance between the electron conductivity and dispersibility may be exhibited. When the content of the conductive material is beyond the above-mentioned range, for example, less than 0.1 wt %, in one example, in the preparation of an electrode of a lithium secondary battery, the composition for forming an electrode may include a large amount of organic solvent, resulting in the increase in pores in the electrode, and the decrease in battery capacity due to a reduced active material charging rate. In addition, a drying time to remove the organic solvent may become longer. In addition, when the content of the conductive material is more than 10 wt %, the dispersibility may be degraded. More specifically, the conductive material including the carbon-based material may be included at 0.1 wt % to 2 wt % with respect to the total weight of a solid content in the composition for forming a positive electrode.

In addition, the dispersing agent may be included at 10 parts by weight to 50 parts by weight with respect to 100 parts by weight of the conductive material. When the content of the dispersing agent is less than 10 parts by weight, it is difficult to uniformly disperse the conductive material in the dispersed liquid, and when the content of the dispersing agent is more than 50 parts by weight, there is concern about decreased processability due to an increased viscosity of the composition.

More specifically, the dispersing agent may be included at 0.1 wt % to 10 wt % with respect to the total weight of a solid content in the composition for forming a positive electrode. When the content of the dispersing agent is less than 0.1 wt %, the dispersibility of the conductive material may not be significantly improved although the dispersing agent is used, and when the content of the dispersing agent is more than 10 wt %, there may be concerns about the increase in resistance in the positive electrode, and the decrease in capacity characteristic of the battery because of the relative decrease in content of active material positive electrode.

In addition, the positive electrode active material may be included at 80 wt % to 98 wt % with respect to the total weight of a solid content in the composition for forming a positive electrode. When the content of the positive electrode active material is less than 80 wt %, the capacity characteristic may be degraded, and when the content of the positive electrode active material is more than 98 wt %, the battery characteristic may be degraded due to the relative decrease in contents of the conductive material and the dispersing agent.

In addition, the solvent may be included at an amount such that the composition for forming a positive electrode has a suitable viscosity for easy and uniform coating with the composition for forming a positive electrode.

In addition, the composition for forming a positive electrode according to an exemplary embodiment of the present invention may further include a dispersion stabilizer for increasing dispersion stability of the conductive material.

The dispersion stabilizer exhibits a wrapping effect such that it adsorbs to the surface of the conductive material to surround the conductive material, thereby preventing aggregation of carbon black. Therefore, the dispersion stabilizer may have excellent miscibility for the dispersing agent and the solvent, as well as excellent affinity to the conductive material. Specifically, the dispersion stabilizer may be polyvinylpyrrolidone.

In addition, the dispersion stabilizer may have a weight average molecular weight of 20,000 g/mol to 5,000,000 g/mol. When the molecular weight of the dispersion stabilizer is too small, for example, less than 20,000 g/mol, it is difficult to exhibit a sufficient wrapping effect for the carbon black, and when the molecular weight of the dispersion stabilizer is excessively large, for example, more than 5,000,000 g/mol, due to reduction in molecular movement of the dispersion stabilizer in a dispersion medium, it is difficult to sufficiently wrap the carbon black. More specifically, the weight average molecular weight of the dispersion stabilizer may be 70,000 g/mol to 2,000,000 g/mol.

In addition, the dispersion stabilizer may be used at 1 part by weight to 10 parts by weight with respect to 100 parts by weight of the conductive material. When the content of the dispersion stabilizer is much smaller than the content of the conductive material, it is difficult to obtain a sufficient wrapping effect, resulting in aggregation between the conductive materials.

The composition for forming a positive electrode according to an exemplary embodiment of the present invention, which has the above-described composition, may be prepared by a preparation method, which includes preparing a conductive material dispersed liquid by milling a mixture of the conductive material and the dispersing agent in a solvent (Step 1); and adding a positive electrode active material and selectively a binder and another type of additive to the conductive material dispersed liquid, followed by mixing (Step 2). Here, the conductive material includes a carbon-based material having a specific surface area of 130 m$^2$/g or more and an oil absorption number of 220 ml/100 g or more at 0.1 wt % to 2 wt % with respect to the total weight of a solid content in the composition for forming a positive electrode, and the conductive material dispersed liquid includes a conductive material-dispersing agent composite in which the dispersing agent is introduced into the conductive material, which has a particle size distribution $D_{50}$ of 0.8 μm to 1.2 μm.

Hereinafter, explaining the method by steps in further detail, the step 1 for preparing the composition for forming a positive electrode according to an exemplary embodiment of the present invention is to prepare a conductive material dispersed liquid.

Specifically, the conductive material dispersed liquid may be prepared by mixing the conductive material and a dispersing agent in a solvent to prepare a mixture, and then milling the mixture.

The mixing process may be performed by a conventional mixing or dispersing method, and specifically, using a homogenizer, a bead mill, a ball mill, a basket mill, an attrition mill, an all-purpose stirrer, a clear mixer or a TK mixer.

In addition, the milling process may be performed by a conventional milling method using a ball mill, a bead mill, or a basket mill, and more specifically, using a bead mill.

In addition, during the milling process, since dispersibility of the conductive material and a dispersed particle size of the conductive material-dispersing agent composite may be changed according to conditions such as the diameter and filling ratio of a bead mill, the rotation speed of a rotor, and an ejection speed of the conductive material dispersed liquid during the milling process, the milling process may be performed under milling conditions optimized by the types and contents of the conductive material and the dispersing agent used.

Specifically, in the preparation of a positive electrode active material for a secondary battery according to an exemplary embodiment of the present invention, according to the use of the conductive material and the dispersing agent described above, the bead mill used in the milling process may have a diameter of 0.5 mm to 2 mm, and more specifically 0.7 mm to 1.5 mm.

In addition, the filling ratio of the bead mill may be 50 wt % to 90 wt %, and more specifically, 80 wt % to 90 wt %, with respect to the total weight of the conductive material dispersed liquid.

In addition, a peripheral speed during the bead mill process may be 6 m/s to 12 m/s, more specifically 7 m/s to 12 m/s.

In addition, on condition that all the above-mentioned conditions for the bead mill process are satisfied, an ejection speed of the mixture may be 0.5 kg/min to 1.5 kg/min, and more specifically 0.5 kg/min to 1 kg/min. When the ejection speed of the conductive material dispersed liquid is beyond the above-mentioned range, the particle size distribution parameter of the conductive material-dispersing agent composite in the composition for forming a positive electrode may not be satisfied, resulting in decreased dispersibility of the conductive material, which is not ineffective for the present invention.

Subsequently, Step 2 for preparing the composition for forming a positive electrode according to an exemplary embodiment of the present invention is to prepare a composition for forming a positive electrode by mixing a positive electrode active material, and selectively a binder and another type of additive with the conductive material dispersed liquid prepared in Step 1.

The mixing process may be performed by a conventional mixing or dispersing method, and specifically, using a homogenizer, a bead mill, a ball mill, a basket mill, an attrition mill, an all-purpose stirrer, a clear mixer or a TK mixer.

According to the above-described preparation method, a composition for forming a positive electrode in which a positive electrode active material, a conductive material and a dispersing agent are uniformly dispersed in a solvent is prepared.

Here, the conductive material and the dispersing agent may be dispersed in the form of a conductive material-dispersing agent composite in which a dispersing agent is introduced to the surface of the conductive material by physical or chemical bonding. Specifically, the conductive material-dispersing agent composite may have a particle size distribution $D_{50}$ of 0.8 μm to 1.2 μm, and a particle size distribution $D_{90}$ of 2.0 μm to 5.0 μm.

The particle size distribution $D_{50}$ and $D_{90}$ of the conductive material-dispersing agent composite may be defined as particle sizes based on 50% and 90% of the particle size distribution, respectively. In addition, the particle size distribution $D_{50}$ of the composite may be measured using, for example, a laser diffraction method, and more specifically, by dispersing the composite in a solvent, and then introducing the dispersion into a commercially-available laser diffraction particle size analysis instrument (e.g., Microtrac MT 3000), and applying approximately 28 kHz of ultrasonic waves with a power of 60 W, thereby calculating the average particle size based on 50% particle size distribution ($D_{50}$) in the instrument.

As described above, the composition for forming a positive electrode according to an exemplary embodiment of the present invention may exhibit excellent conductivity throughout the entire electrode in the manufacture of an electrode by uniform dispersion of a conductive material having excellent conductivity, resulting in the considerable increase in performance of a battery including a resistance characteristic, a lifespan characteristic, a capacity characteristic and rate capability.

According to still another exemplary embodiment of the present invention, a positive electrode manufactured using the composition for forming a positive electrode is provided. In the present invention, the manufacture of the positive electrode using the composition for forming a positive electrode means that the positive electrode includes the composition for forming a positive electrode, a dried product thereof, or a cured product.

The positive electrode according to an exemplary embodiment of the present invention may be manufactured by a conventional method except that a positive electrode active material layer is formed using the composition for forming a positive electrode. Specifically, the positive electrode may be manufactured by coating a positive electrode collector with the composition for forming a positive electrode, followed by drying; or casting the composition for forming a positive electrode on a separate support, and then laminating a film peeled from the support on the positive electrode collector.

Specifically, the positive electrode manufactured according to the above-described manufacturing method includes a positive electrode collector, and a positive electrode active material layer which is located on the positive electrode collector and in which a conductive material-dispersing agent composite is uniformly dispersed.

In addition, the positive electrode collector is not particularly limited as long as it does not cause a chemical change in a battery and has conductivity, and may be, for example, copper, stainless steel, aluminum, nickel, titanium, calcined carbon, or aluminum or stainless steel whose surface is treated with carbon, nickel, titanium or silver. In addition, the collector may conventionally have a thickness of 3 to 500 μm, and an adhesive strength of the positive electrode active material may be increased by imparting fine unevenness on the surface of the collector. For example, the positive electrode collector may be used in various forms such as a film, a sheet, a foil, a net, a porous body, a foaming body, and a non-woven fabric body.

According to yet another exemplary embodiment of the present invention, an electrochemical device including the positive electrode is provided. The electrochemical device may be, specifically, a battery or a capacitor, and more specifically, a lithium secondary battery.

The lithium secondary battery includes, specifically, a positive electrode, a negative electrode located opposite to the positive electrode, a separator interposed between the positive electrode and the negative electrode, and an electrolyte, and the positive electrode is the same as described above. In addition, the lithium secondary battery may selectively further include a battery case accommodating an electrode assembly composed of the positive electrode, the negative electrode and the separator, and a sealing member sealing the battery case.

The negative electrode includes a negative electrode active material layer which is located on a negative electrode collector and the negative electrode collector. The negative electrode active material layer may include a negative electrode active material, and selectively at least one of a binder, a conductive material and other types of additives.

The negative electrode active material is a compound capable of reversible intercalation and deintercalation of lithium ions, and may be a carbon-based material such as artificial graphite, natural graphite, graphitized carbon fiber, or amorphous carbon; a metallic compound which is able to form an alloy with lithium, such as Si, Al, Sn, Pb, Zn, Bi, In, Mg, Ga, Cd, a Si alloy, an Sn alloy or an Al alloy; a metal oxide capable of doping/dedoping lithium ions, such as $SiO_x(0<x<2)$, $SnO_2$, a vanadium oxide, or a lithium vanadium oxide; or a composite including the metallic compound and a carbon material, such as a Si—C composite or a Sn—C composite, which may be used alone or in combination of two or more thereof. In addition, as the negative electrode active material, a metal lithium thin film may be used. In addition, the carbon material may be any one of low crystalline carbon and high crystalline carbon. As a representative example, the low crystalline carbon is soft carbon or hard carbon, and the high crystalline carbon is high temperature calcined carbon, for example, amorphous, platy, flaky, spherical or fibrous natural or artificial graphite, Kish graphite, pyrolytic carbon, mesophase pitch based carbon fiber, meso-carbon microbeads, mesophase pitches and petroleum or coal tar pitch derived cokes.

In addition, the binder and the conductor may be the same as described in the positive electrode.

Meanwhile, in the lithium secondary battery, a separator divides a negative electrode and a positive electrode, provides a migration path of lithium ions, and can use any one used in conventional lithium secondary batteries as a separator without particular limitation. Particularly, one that has a low resistance with respect to the ion migration of an electrolyte, and excellent moisture retainability of an electrolyte solution. Specifically, a porous polymer film, for example, a porous polymer film manufactured of a polyolefin-based polymer such as an ethylene homopolymer, a propylene homopolymer, an ethylene/butene copolymer, an ethylene/hexene copolymer or an ethylene/metacrylate copolymer or a laminate structure having two or more layers thereof, may be used. In addition, as a separator, a conventional porous non-woven fabric body, for example, a non-woven fabric body made of glass fiber or polyethyleneterephthalate fiber with a high melting point, may be used. In addition, to ensure a thermal resistance or mechanical strength, a coated separator including a ceramic component or a polymer material may be used, or may be selectively formed in a single- or multi-layer structure.

In addition, as an electrolyte used in the present invention, an organic liquid electrolyte, an inorganic liquid electrolyte, a solid polymer electrolyte, a gel-like polymer electrolyte, aninorganic solid electrolyte, or a molten-type inorganic electrolyte, which can be used in manufacture of a lithium secondary battery, may be used, but the present invention is not limited thereto.

Specifically, the electrolyte may include an organic solvent and a lithium salt.

The organic solvent may be any one that can serve as a medium in which ions involved in an electrochemical reaction of a battery can be migrated without particular limitation. Specifically, the organic solvent may be an ester-based solvent such as methyl acetate, ethyl acetate, γ-butyrolactone or ε-caprolactone; an ether-based solvent such as dibutyl ether or tetrahydrofuran; a ketone-based solvent such as cyclohexanone; an aromatic hydrocarbon-based solvent such as benzene or fluorobenzene; or a carbonate-based solvent such as dimethylcarbonate (DMC), diethylcarbonate (DEC), methylethylcarbonate (MEC), ethylmethylcarbonate (EMC), ethylene carbonate (EC), or propylene carbonate (PC).

Among these, the organic solvent is preferably a carbonate-based solvent, and more preferably, a mixture of a cyclic carbonate (e.g., ethylene carbonate or propylene carbonate) having a high ion conductivity and a high permittivity and capable of improving charge/discharge performance of a battery, and a linear carbonate-based compound (e.g., ethylmethyl carbonate, dimethyl carbonate or diethyl carbonate) having a low viscosity.

The lithium salt may be any compound capable of providing lithium ions used in a lithium secondary battery without particular limitation. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The lithium salt may be included at a concentration of approximately 0.6 mol % to 2 mol % in the electrolyte.

In addition to the components of the electrolyte, to improve the lifespan characteristic of a battery, inhibit a decrease in battery capacity, and improve discharge capacity of a battery, the electrolyte may further include one or more of additives including pyridine, triethylphosphite, triethanolamine, cyclic ether, ethylene diamine, n-glyme, hexaphosphoric triamide, nitrobenzene derivatives, sulfur, quinoneiminedyes, N-substituted oxazolidinone, N,N-substituted imidazolidine, ethylene glycol dialkyl ether, ammonium salts, pyrrole, 2-methoxy ethanol, aluminum trichloride, etc. Here, the additive may be included at 0.1 wt % to 5 wt % with respect to the total weight of the electrolyte.

The lithium secondary battery having the above-described configuration may be manufactured by manufacturing an electrode assembly by interposing a separator between a positive electrode and a negative electrode, placing the electrode assembly in a case, and injecting an electrolyte solution into the case. Alternatively, the lithium secondary battery may be manufactured by stacking the electrode assembly, impregnating the stacked structure with an electrolyte solution, housing the obtained result in a battery case and then sealing the case.

The above-described lithium secondary battery including the positive electrode manufactured using the composition for forming a positive electrode according to an exemplary embodiment of the present invention may stably exhibit excellent discharge capacity, output characteristic and capacity retention rate due to uniform dispersion of the conductive material in the positive electrode. As a result, the lithium secondary battery is useful for portable devices such as mobile phones, notebook computers, digital cameras, etc., and an electric automobile field for a hybrid electric vehicle (HEV).

Therefore, according to another exemplary embodiment of the present invention, a battery module including the lithium secondary battery as a unit cell, and a battery pack including the same are provided.

The battery module or battery pack may be used as a power source for any one or more medium-and-large sized devices of power tools; electric cars such as an electric vehicle (EV), a hybrid electric vehicle, and a plug-in hybrid electric vehicle (PHEV); and systems for storing electric power.

EXAMPLES

Hereinafter, examples of the present invention will be described in detail to be easily implemented by those of ordinary skill in the art. However, the present invention may be embodied various forms and is not limited to those described herein.

Example 1

A conductive material dispersed liquid was prepared by adding carbon black (SSA=135 m$^2$/g, OAN=220 ml/100 g) shown in Table 1 below as a conductive material, and a partially hydrogenated nitrile rubber shown in Table 2 below as a dispersing agent and mixing them in a composition ratio shown in Table 3 below in an N-methyl-pyrrolidone (NMP) solvent, and performing a bead milling process under conditions below.

Subsequently, LiNi$_{0.7}$Co$_{0.15}$Mn$_{0.15}$O$_2$ (average particle size (D$_{50}$)=10 μm) and polyvinylidenefluoride (PVDF) were added to the prepared conductive material dispersed liquid and mixed using a homo mixer for 1 hour, thereby preparing a composition for forming a positive electrode.

<Milling Process Parameters>
Rotor diameter: 150 mm
Rotor speed: 1,000 rpm
Rotor peripheral speed: 7.9 m/s
Bead diameter: 1.25 mm
Bead filling ratio: 80 wt %
Ejection speed: 1 kg/min Example 2

A composition for forming a positive electrode was prepared by the same method as described in Example 1, except that individual components were used at a composition ratio shown in Tables 1 to 3 below, and a bead milling process for preparing a conductive material dispersed liquid was performed at an ejection speed of 0.5 kg/min.

Example 3

A composition for forming a positive electrode was prepared by the same method as described in Example 1, except that individual components were used at a composition ratio shown in Tables 1 to 3 below, and a bead milling process for preparing a conductive material dispersed liquid was performed at an ejection speed of 1.2 kg/min.

Comparative Example 1

A composition for forming a positive electrode was prepared by the same method as described in Example 1, except that individual components were used at a composition ratio shown in Tables 1 to 3 below, and a bead milling process for preparing a conductive material dispersed liquid was performed at an ejection speed of 2 kg/min Comparative Example 2

A composition for forming a positive electrode was prepared by the same method as described in Example 1, except that individual components were used at a composition ratio shown in Tables 1 to 3 below, and a bead milling process for preparing a conductive material dispersed liquid was performed at an ejection speed of 0.3 kg/min.

Comparative Example 3

A composition for forming a positive electrode was prepared by the same method as described in Example 1, except that individual components were used at a composition ratio shown in Tables 1 to 3 below.

Comparative Example 4

A composition for forming a positive electrode was prepared by the same method as described in Example 1, except that individual components were used at a composition ratio shown in Tables 1 to 3 below, and polyvinyl alcohol (PVA) was used as a dispersing agent.

TABLE 1

| | Conductive material | | | |
|---|---|---|---|---|
| | Type | Average diameter of primary particles (nm) | SSA of secondary particles (m$^2$/g) | OAN (ml/100 g) |
| Example 1 | Carbon black | 30 | 135 | 220 |
| Example 2 | Carbon black | 22 | 230 | 362 |
| Example 3 | Carbon black | 26 | 170 | 272 |
| Comparative Example 1 | Carbon black | 30 | 135 | 220 |
| Comparative Example 2 | Carbon black | 30 | 135 | 220 |
| Comparative Example 3 | Carbon black | 36 | 63 | 190 |
| Comparative Example 4 | Carbon black | 30 | 135 | 220 |

TABLE 2

| | Partially hydrogenated nitrile rubber dispersing agent | | | | | |
|---|---|---|---|---|---|---|
| | AN (wt %) | BD (wt %) | HBD (wt %) | BA (wt %) | Mw (×1000 g/mol) | PDI |
| Example 1 | 21 | 1 | 50 | 28 | 300 | 3.1 |
| Example 2 | | | | | | |
| Example 3 | | | | | | |
| Comparative Example 1 | | | | | | |
| Comparative Example 2 | | | | | | |
| Comparative Example 3 | | | | | | |

In Table 2, AN is a repeat unit of an acrylonitrile-derived structure in the partially hydrogenated nitrile rubber, BD is a repeat unit of a butadiene-derived structure, HBD is a repeat unit of a hydrogenated butadiene-derived structure, and BA is a repeat unit of a n-butylacrylate-derived structure, a content of the repeat unit of each structure (wt %) is a value based on the total weight of the partially hydrogenated nitrile rubber.

TABLE 3

| | Composition of composition for forming positive electrode (parts by weight) | | | |
|---|---|---|---|---|
| | Positive electrode active material | Conductive material | Dispersing agent | Binder |
| Example 1 | 96.67 | 2.0 | 0.2 | 1.13 |
| Example 2 | 97.34 | 1.3 | 0.23 | 1.13 |
| Example 3 | 97.05 | 1.6 | 0.22 | 1.13 |
| Comparative Example 1 | 96.67 | 2.0 | 0.2 | 1.13 |
| Comparative Example 2 | 96.67 | 2.0 | 0.2 | 1.13 |
| Comparative Example 3 | 96.67 | 2.0 | 0.2 | 1.13 |
| Comparative Example 4 | 96.67 | 2.0 | 0.2 | 1.13 |

Preparation Example: Manufacture of Positive Electrode and Lithium Secondary Battery A positive electrode was manufactured by coating one surface of aluminum foil with the composition for forming a positive electrode prepared in each of Examples 1 to 3 and Comparative Examples 1 to 4, drying and roll-pressing the coated surface, and then punching it in a predetermined size.

In addition, a negative electrode slurry was prepared by adding carbon powder as a negative electrode active material, carboxymethyl cellulose as a thickening agent, styrene-butadiene rubber as a binder, and carbon black as a conductive material to water as a solvent in a weight ratio of 96:1:2:1, respectively. The negative electrode slurry was applied on a copper (Cu) thin film having a thickness of 10 µm as a negative electrode collector, dried and roll-pressed, resulting in manufacturing a negative electrode.

The positive electrode and the negative electrode, manufactured as described above, were placed to face each other, and a tri-layered separator consisting of polypropylene/polyethylene/polypropylene (PP/PE/PP) was interposed between the positive electrode and the negative electrode, resulting in manufacturing a battery assembly. After housing the battery assembly in a battery case, a non-aqueous electrolyte solution, which includes a non-aqueous organic solvent having the composition of ethylene carbonate (EC): ethyl methyl carbonate (EMC): dimethyl carbonate (DMC) =3:3:4 (volume ratio) and 1 mol/L of $LiPF_6$ as a lithium salt based on the total weight of the non-aqueous electrolyte solution, was injected into the case, thereby manufacturing a lithium secondary battery.

Experimental Example 1

In each of the compositions for forming a positive electrode prepared in each of Examples 1 to 3 and Comparative Examples 1 to 4, particle size distribution of a conductive material was measured.

Particle size: The prepared composition for forming a positive electrode was diluted 500× using an NMP solvent, and $D_{50}$ and $D_{90}$ values of particle size distribution of a carbon black-dispersing agent composite dispersed in a dispersed liquid were measured using a Mastersizer 3000 instrument (Malvern Instruments). The results are shown in Table 4 below.

TABLE 4

| | Particle size (µm) | |
|---|---|---|
| | $D_{50}$ | $D_{90}$ |
| Example 1 | 1.0 | 2.9 |
| Example 2 | 0.85 | 2.1 |
| Example 3 | 1.1 | 3.2 |
| Comparative Example 1 | 1.8 | 7.5 |
| Comparative Example 2 | 0.7 | 1.6 |
| Comparative Example 3 | 1.13 | 3.0 |
| Comparative Example 4 | 0.97 | 2.05 |

As a result, the carbon black-dispersing agent composites in the compositions for forming a positive electrode of Examples 1 to 3 had more uniform particle size distributions than Comparative Example 1, and higher particle size distributions than Comparative Example 2. Comparative Examples 3 and 4 showed particle size distributions similar to those of Examples 1 to 3. In Comparative Examples 3 and 4, since milling was performed under the same conditions as Example 1, it can be confirmed that particle size distribution can be controlled according to the milling condition.

Experimental Example 2

A resistance characteristic was evaluated on the battery manufactured according Preparation Example using each of the compositions for forming a positive electrode prepared in Examples 1 to 3 and Comparative Examples 1 to 4.

In detail, the manufactured lithium secondary battery was charged/discharged at 1.0 C/1.0 C three times at 25° C., and the state of charge (SOC) was set based on the final discharge capacity. At SOC15, SOC30 and SOC50, a 10-second resistance was measured with a discharge pulse of 6.5 C, respectively. The result is shown in Table 5.

TABLE 5

| | Resistance (mOhm) | | |
|---|---|---|---|
| | SOC15 | SOC30 | SOC50 |
| Example 1 | 1.3320 | 1.1721 | 1.1125 |
| Example 2 | 1.3411 | 1.1854 | 1.1205 |
| Example 3 | 1.3365 | 1.1803 | 1.1179 |
| Comparative Example 1 | 1.4459 | 1.2755 | 1.2222 |
| Comparative Example 2 | 1.3895 | 1.2285 | 1.1646 |
| Comparative Example 3 | 1.4924 | 1.3251 | 1.2873 |
| Comparative Example 4 | 1.3702 | 1.2091 | 1.1595 |

From the experimental result, when the particle size of the carbon black-dispersing agent composite is large like Comparative Example 1, and the particle size of the carbon black-dispersing agent composite is excessively small like Comparative Example 2, high resistance was exhibited. Contrarily, it can be confirmed that Examples 1 to 3 show lower cell resistances in high rate discharge than Comparative Examples 1 and 2. Therefore, it can be noted that the optimal dispersed particle size of the conductive material-dispersing agent composite was present. In addition, it can be confirmed that, like Comparative Example 3, when the specific surface area of carbon black is less than 130 $m^2/g$, the volume of the conductive material becomes smaller, resulting in the decrease in conductivity of the electrode and an increase in resistance, and like Comparative Example 4, when PVA was used as a dispersing agent, the positive electrode active material was coated with PVA for insulation, thereby increasing a resistance, compared to the Examples using an H-NBR dispersing agent.

Experimental Example 3

Rate capability was evaluated for the battery manufactured using each of the compositions for forming a positive electrode prepared in Examples 1 to 3 and Comparative Examples 1 to 4.

In detail, using each of the compositions for forming a positive electrode prepared in Example 1 and Comparative Examples 1 to 4, two unit cells were manufactured by the same method as used in Preparation Example, and the manufactured unit cells were charged at a constant current (CC) of 0.1 C and 25° C. until 4.25 V, and then changed at a constant voltage (CV) of 4.25 V until a charge current reached 0.05 mAh, resulting in the first charge. Afterward, the cell was left for 20 minutes and were discharged at a constant current of 0.1 C until 3.0 V, and a discharge capacity in the first cycle was measured. Afterward, by changing the discharge condition into 2.0 C, the capacity characteristic by rate was evaluated.

The rate capacity is the ratio of a capacity when a battery that has been charged at 0.1 C is discharged at 2.0 C with respect to a capacity when a battery that has been charged at 0.1 C is discharged at 0.1 C in percentages. The result is shown in Table 6.

TABLE 6

|  |  | Capacity by rate (%) | |
| --- | --- | --- | --- |
|  |  | 0.1 C | 2.0 C |
| Example 1 | First cell | 100 | 91.6 |
|  | Second cell | 100 | 91.7 |
| Example 2 | First cell | 100 | 91.4 |
|  | Second cell | 100 | 91.5 |
| Example 3 | First cell | 100 | 91.3 |
|  | Second cell | 100 | 91.5 |
| Comparative Example 1 | First cell | 100 | 91.6 |
|  | Second cell | 100 | 90.7 |
| Comparative Example 2 | First cell | 100 | 90.6 |
|  | Second cell | 100 | 90.9 |
| Comparative Example 3 | First cell | 100 | 88.8 |
|  | Second cell | 100 | 88.2 |
| Comparative Example 4 | First cell | 100 | 91.0 |
|  | Second cell | 100 | 90.9 |

From the experimental result, it can be confirmed that, in Comparative Examples 1 and 2 having a large dispersed particle size, variations between cells were increased, and in Comparative Example 1 having a much larger dispersed particle size, the deviation between cells was larger. In addition, in Comparative Example 3 using carbon black having a small specific surface area and Comparative Example 4 using PVA as a dispersing agent, the variations between cells were small, but the rate capacity was decreased, compared to Examples 1 to 3. However, it can be noted that, in Examples 1 to 3, there was almost no deviation between cells, and thus an excellent rate capacity was exhibited. Specifically, in Comparative Example 3, the specific surface area and the oil absorption number were less than 130 m$^2$/g and less than 220 ml/100 g, indicating that the structure of the conductive material was less developed. Therefore, it seems that the conductive material has a small volume per weight and thus cannot sufficiently cover the surface of an active material, resulting in a decrease in cell performance. In Comparative Example 4, by using PVA as a dispersing agent, it seems that the positive electrode active material was coated with the PVA for insulation, or the PVA was modified to degrade the discharge characteristic, resulting in a decrease in cell performance.

Experimental Example 4

A capacity retention at high temperature was evaluated for the battery manufactured using each of the compositions for forming a positive electrode prepared in Examples 1 to 3 and Comparative Examples 1 to 4.

In detail, the lithium secondary battery was charged at 1 C until 4.25 V under constant current/constant voltage (CC/CV) conditions at 45° C., and discharged at 1 C until 3.0 V under a constant current (CC) condition. This process was set as one cycle, and repeated in 490 cycles, and then the capacity retention in the 490$^{th}$ cycle was measured for each battery. The result is shown in Table 7.

TABLE 7

|  |  | Capacity retention in 490$^{th}$ cycle (at 45° C.) | |
| --- | --- | --- | --- |
|  |  | Capacity retention (%) | Average |
| Example 1 | First cell | 90.1 | 90.0 |
|  | Second cell | 89.7 |  |
| Example 2 | First cell | 89.8 | 89.7 |
|  | Second cell | 89.5 |  |
| Example 3 | First cell | 90.1 | 90.1 |
|  | Second cell | 90.1 |  |
| Comparative Example 1 | First cell | 83.5 | 86.0 |
|  | Second cell | 88.4 |  |
| Comparative Example 2 | First cell | 90.0 | 89.4 |
|  | Second cell | 88.7 |  |
| Comparative Example 3 | First cell | 84.1 | 84.5 |
|  | Second cell | 84.8 |  |
| Comparative Example 4 | First cell | 87.1 | 87.3 |
|  | Second cell | 87.4 |  |

From the experimental result, the battery including the positive electrode manufactured using each of the compositions for forming a positive electrode of Examples 1 to 3 exhibited a much higher high-temperature capacity retention, and the smallest variation between cells. It seems that as the conductive material included in each of Examples 1 to 3 formed a conductive material-dispersing agent composite with the dispersing agent, the conductive material in the positive electrode was uniformly dispersed, thereby stably exhibiting an excellent capacity retention.

The invention claimed is:

1. A composition for forming a positive electrode of a secondary battery, comprising:
   a positive electrode active material, and a conductive material-dispersing agent composite having a particle size distribution $D_{50}$ of 0.8 μm to 1.2 μm,
   wherein the conductive material-dispersing agent composite is prepared by mixing a conductive material and a dispersing agent,
   wherein the conductive material includes a carbon-based material, wherein the carbon-based material has a specific surface area of 130 m$^2$/g or more and an oil absorption number of 220 ml/100 g or more, wherein the carbon-based material is included in an amount of 0.1 wt % to 2 wt % with respect to a total weight of the composition for forming the positive electrode, wherein the dispersing agent includes a partially hydrogenated nitrile rubber which includes a repeat unit of a hydrogenated conjugated diene-derived structure at 20 wt % to 50 wt % with respect to the total weight of the rubber, and wherein the partially hydrogenated nitrile rubber is acrylonitrile-butadiene rubber which includes a repeat unit of a structure of Formula 1 below, a repeat unit of a structure of Formula 2 below, a repeat unit of a structure of Formula 3 below and a repeat unit of a structure derived from an ester of α, β-unsaturated carboxylic acid, and the acrylonitrile-butadiene rubber includes the repeat unit of the structure of Formula 3 below at 20 wt % to 50 wt % with respect to the total weight of the rubber:

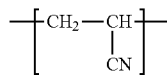
[Formula 1]

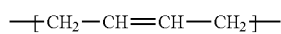
[Formula 2]

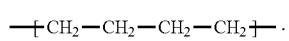
[Formula 3]

2. The composition of claim 1, wherein the conductive material-dispersing agent composite has a particle size distribution $D_{90}$ of 2.0 μm to 5.0 μm.

3. The composition of claim 1, wherein the carbon-based material is secondary particles prepared by assembling primary particles.

4. The composition of claim 1, wherein the carbon-based material is carbon black.

5. The composition of claim 1, wherein the partially hydrogenated nitrile rubber includes a repeat unit of an α, β-unsaturated nitrile-derived structure at 20 wt % to 50 wt % with respect to the total weight of the rubber.

6. The composition of claim 1, wherein the partially hydrogenated nitrile rubber has a weight average molecular weight of 10,000 g/mol to 700,000 g/mol.

7. The composition of claim 1, wherein the dispersing agent is included at 10 parts by weight to 50 parts by weight with respect to 100 parts by weight of the conductive material.

8. The composition of claim 1, wherein the specific surface area of the carbon-based material is from 130 $m^2$/g to 270 130 $m^2$/g.

9. The composition of claim 1, wherein the oil absorption number of the carbon-based material is from 220 ml/100 g to 400 ml/100 g.

10. A positive electrode of a secondary battery manufactured using the composition for forming a positive electrode of claim 1.

11. A lithium secondary battery comprising the positive electrode of claim 10.

12. A method of preparing a composition for forming a positive electrode of a secondary battery of claim 1, comprising:
(1) preparing a conductive material dispersed liquid by milling a mixture of a conductive material and a dispersing agent in a solvent; and
(2) adding a positive electrode active material to the conductive material dispersed liquid and mixing them together,
wherein the conductive material includes a carbon-based material having a specific surface area of 130 $m^2$/g or more and an oil absorption number of 220 ml/100 g or more at 0.1 wt % to 2 wt % with respect to the total weight of the composition for forming a positive electrode, and
the conductive material dispersed liquid includes a conductive material-dispersing agent composite in which the dispersing agent is introduced into the conductive material, and the conductive material-dispersing agent composite has a particle size distribution $D_{50}$ of 0.8 μm to 1.2 μm,
(3) resulting in said composition for forming said positive electrode of said secondary battery of claim 1.

13. The method of claim 12, wherein the milling is performed by filling a bead mill having a diameter of 0.5 mm to 2 mm at a filling ratio of 50 wt % to 90 wt % with respect to the total weight of the conductive material dispersed liquid.

14. The method of claim 12, wherein the milling is performed by rotating the mixture at a peripheral speed of 6 m/s to 12 m/s.

15. The method of claim 12, wherein the milling is performed by ejecting the mixture at an ejection speed of 0.5 kg/min to 1.5 kg/min.

* * * * *